Sept. 17, 1940.   H. T. YOUNGREN   2,214,948
MOTOR VEHICLE CHASSIS
Filed April 30, 1938    2 Sheets-Sheet 1
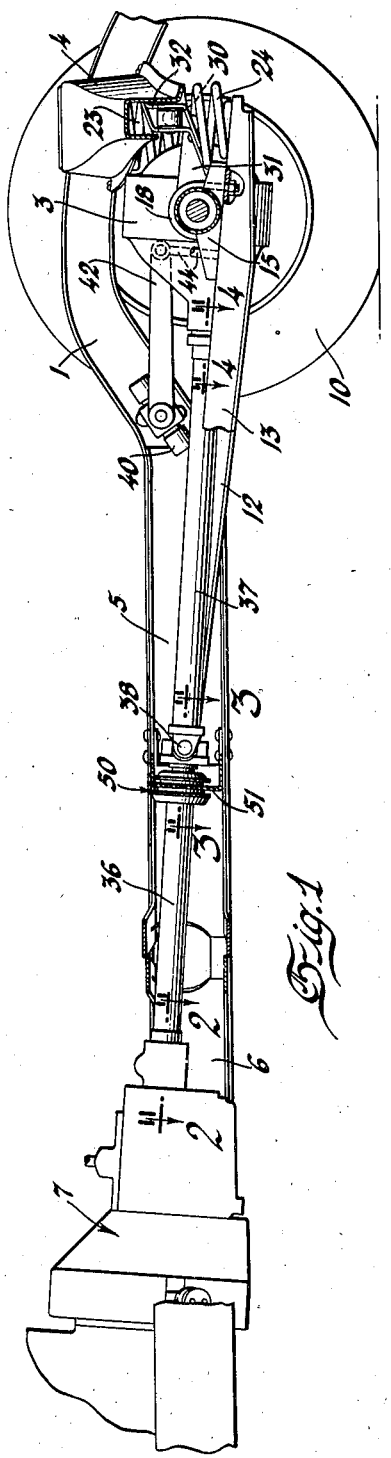
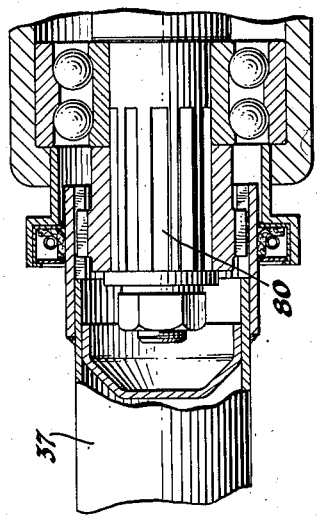
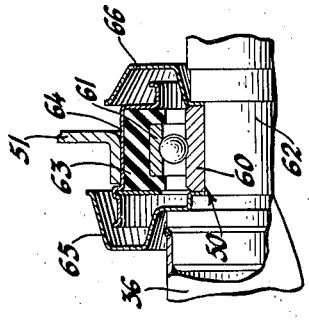
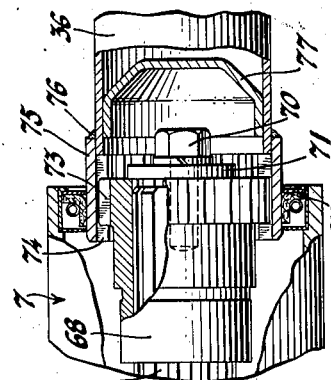
Inventor
Harold T. Youngren
By
Blackmore, Spencer & Hurd
Attorneys Patented Sept. 17, 1940

2,214,948

UNITED STATES PATENT OFFICE 2,214,948

MOTOR VEHICLE CHASSIS

Harold T. Youngren, Lansing, Mich., assignor to General Motors Corporation, Detroit, Mich., a corporation of Delaware Application April 30, 1938, Serial No. 205,157

6 Claims. (Cl. 180—73)

This invention relates to a motor vehicle having a conventional driving axle carrying road wheels on opposite sides of the vehicle of the type in which movement of the axle longitudinally and transversely of the vehicle is controlled by means separate from the resilient suspension means between the axle and the vehicle frame, so that the resilient suspension means has the single function of resisting upward movement of the axle relatively to the vehicle frame.

It relates particularly to a construction in which movement of the axle longitudinally of the vehicle is controlled by longitudinally disposed support arms rigidly connected to opposite ends of the axle and pivotally connected to the vehicle frame.

The object of the invention is a construction in which only one universal joint is necessary in the propeller shaft drive to the rear axle.

Another object of the invention is a construction in which the propeller shaft consists of two sections universally jointed together, there being a bearing for one of said sections at a point adjacent to the universal joint.

The above and other objects of the invention will be apparent as the description proceeds.

According to the invention the universal joint of the propeller shaft has its center on the common pivot axis of two longitudinally disposed support arms for the rear axle, so that the axle and that section of the propeller shaft connected to the axle, pivot about a common center.

In one embodiment, according to the invention, that section of the propeller shaft remote from the axle has its end adjacent to the universal joint supported in a bearing on the vehicle frame.

In another embodiment, according to the invention, that section of the propeller shaft connected to the axle has its end adjacent to the universal joint supported in a bearing mounted on the pivotal support arms through the medium of a cross member rigidly connected between them.

The drawings show the application of the invention to the driven rear axle of a motor vehicle with coil spring suspension.

In the drawings:

Fig. 1 is a longitudinal part sectional elevation of a motor vehicle chassis according to the invention.

Fig. 2 is an enlarged section on line 2—2 of Fig. 1.

Fig. 3 is an enlarged section on line 3—3 of Fig. 1.

Fig. 4 is an enlarged section on line 4—4 of Fig. 1.

Fig. 5 is an enlarged perspective view of the hub teeth of the sliding connection shown in Figs. 2 and 4.

Figure 6:
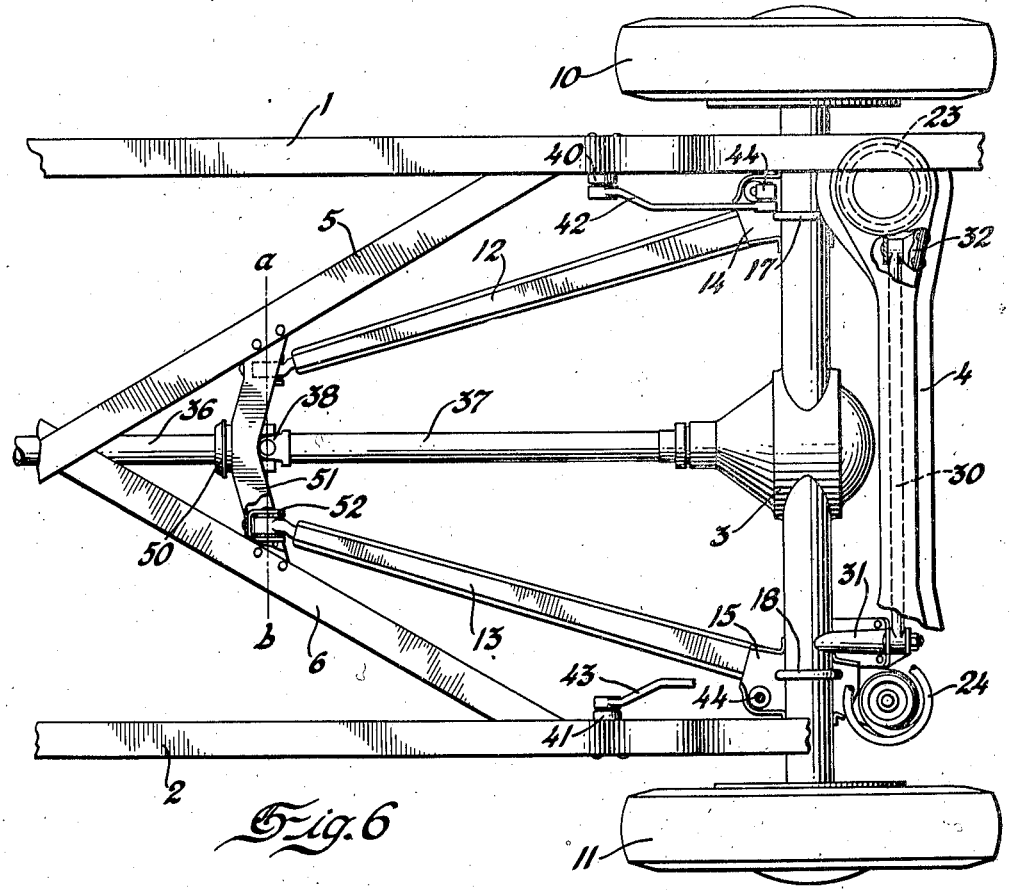
Fig. 6 is a plan view of the rear end of the chassis according to the invention.

The vehicle frame has side members 1 and 2 which are upswept above the rear axle housing 3 to the rear of which there is a transverse member 4. The frame is strengthened by X members 5 and 6, and carries the engine and transmission, generally indicated by the reference numeral 7.

The rear axle housing 3 supports driven rear wheels 10 and 11.

Movement of the rear axle longitudinally of the frame is controlled by the rear axle support arms 12 and 13, which are pivotally connected to the vehicle frame at a point forward of the rear axle 3, and extend below and beyond the rear axle at points towards the opposite ends thereof, where they are respectively rigidly secured to seating brackets 14 and 15 on the axle housing 3 by means of U clips 17 and 18.

The extensions of the support arms 12 and 13 beyond the axle constitute perches for the lower ends of coil springs 23 and 24 resiliently resisting upward movement of the axle 3 relatively to the frame. The upper ends of the springs 23 and 24 have seatings formed in the frame transverse member 4 at the juncture therewith of the frame side members 1 and 2.

Movement of the axle 3 transversely of the frame is controlled by a transverse radius rod 30 which has one end pivotally connected to a bracket 31 on the axle housing 3, towards the left hand side of the vehicle, and its other end pivotally connected to a bracket 32 on the frame transverse member 4, towards the right hand side of the vehicle.

The drive from the engine and transmission 7 to the rear axle 3 is transmitted through a propeller shaft consisting of two tubular sections 36 and 37 connected together by a universal joint 38, which has its center on the line of centers $a$—$b$ of the pivot axes of the support arms 12 and 13, so that the rear section 37 of the propeller shaft and the rear axle support arms swing about a common axis $a$—$b$.

Hydraulic shock absorbers 40 and 41 are mounted on the frame side members 1 and 2 and their operating spindles are provided with lever arms 42 and 43, each having their opposite ends connected to the brackets 14 and 15 on the rear axle 3, through links such as 44.

Rubber bushings are provided in the pivotal connections of the support arms 12 and 13 to the frame, and of the transverse radius rod 30 to the axle and the frame, to permit of the degree of universal movement required at these points for swinging movement of the axle about the axes in different planes.

It will be appreciated that because the section 37 of the propeller shaft and the support arms 12 and 13 with the rear axle 3 swing about a common axis a—b, there is no necessity for a universal joint between the section 37 of the propeller shaft and the rear axle. Similarly, if as shown in Fig. 1, the section 36 of the propeller shaft is coaxial with the engine crankshaft, there is no necessity for a universal joint between the engine and the section 36 of the propeller shaft.

In order however, to provide for production variations in the positioning of various parts of the chassis, a sliding sleeve joint is interposed between the engine and transmission 7 and the section 36 of the propeller shaft as shown in Fig. 2, and a similar joint is interposed between the section 37 of the propeller shaft and the rear axle 3 as shown in Fig. 4.

Referring now to Figs. 1 and 6, the section 36 of the propeller shaft is supported in a bearing 50 on a transverse member 51 rigidly attached between the X members 5 and 6 of the vehicle frame, and the support arms 12 and 13 are pivotally connected to brackets such as 52 on the transverse member 51.

Figure 7:
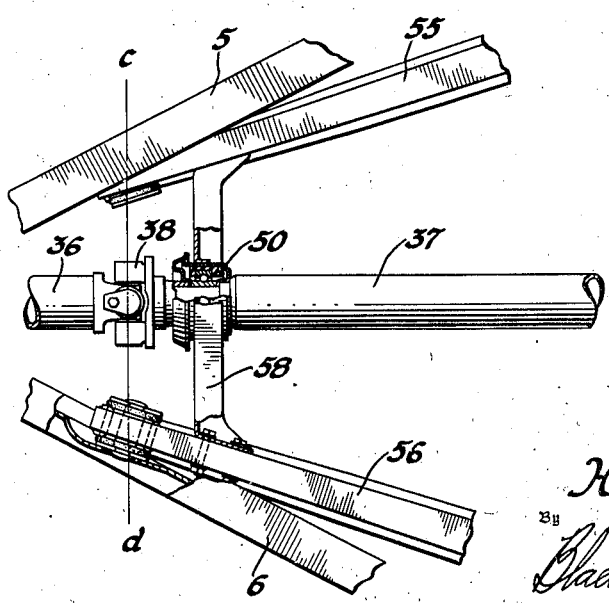
Fig. 7 is a plan view of a modification of the invention.

In the modification shown in Fig. 7, the support arms 55 and 56 which are otherwise similar to the support arms 12 and 13 of Figs. 1 and 6, are pivotally connected to the X members 5 and 6 respectively, and the bearing 50 is mounted on a transverse member 58 rigidly attached between and pivoting with the support arms 55 and 56 to support the section 37 of the propeller shaft instead of the section 36. In this instance it will be observed that the pivot axes of the support arms 55 and 56 are not coaxial, but are normal to the center lines of the support arms so that the support arms 55 and 56 are identical. Nevertheless the universal joint 38 has its center on a line c—d passing through the "centers" of the pivot axes of the support arms 55 and 56, and the rubber bushings at these pivotal points will permit of the necessary universal movement for swinging motion of the rear section 37 of the propeller shaft and the rear axle support arms about the common virtual axis c—d.

As shown most clearly in Fig. 3, the bearing 50 comprises a ball bearing having inner and outer races 60 and 61 of which the inner race is a press fit on a part 62 which is spigoted in, and welded to one section of the tubular propeller shaft, and forms one part of the universal joint 38. The outer race 61 is resiliently mounted in a ring 63 of rubber or other suitable material which is held in a holder 64 in a flanged opening in the transverse member 51 of Figs. 1 and 6, or in the transverse member 58 of Fig. 7. Dirt and water is kept out of the bearing by the sealing rings 65 and 66 in well known manner.

The sliding sleeve joint between the secton 36 of the propeller shaft and the engine and transmission 7 is shown in Fig. 2. It consists of a hub 68 suitably secured to the splined transmission driven shaft 69 by means of the stud 70 and washer 71. The hub 68 is provided with teeth 73 which slide in the spaces between internal teeth 74 on a sleeve 75 welded as at 76 to the end of the tubular section 36 of the propeller shaft, which is plugged by the member 77 to prevent oil from the transmission from running through the propeller shaft. An oil seal 78 of well known form is provided to prevent leakage of oil between the exterior of the sleeve 75 and the housing of the engine and transmission 7.

It will be seen that there is provision for a degree of axial sliding movement between the hub 68 and the sleeve 75, and in order to permit of a slight degree of universal movement and to prevent binding between the hub 68 and the sleeve 75, the teeth 73 of the hub 68 are rounded slightly as shown in Fig. 5.

The sliding sleeve joint between the section 37 of the propeller shaft and the drive shaft 80 of the rear axle is shown in Fig. 4, and is essentially similar to the sliding sleeve joint of Fig. 2.

Roll of the vehicle due to the effect of centrifugal force in cornering is resisted to the extent that independent pivotal movement of the support arms 12 and 13 about the axis a—b of Fig. 6, and of the support arms 55 and 56 about the axis c—d of Fig. 7 is prevented by the rigidity of the structure.

It will be appreciated that other things being equal the structure of Fig. 7, with the transverse member 58 between the support arms 55 and 56 will be more rigid and have a greater resistance to roll than the structure of Fig. 6.

I claim:

1. In a motor vehicle, in combination, a frame, an engine driven shaft, a driving axle carrying road wheels on opposite sides of the vehicle, a drive shaft for the axle, a pair of support arms rigidly connected to the axle and pivotally connected to the vehicle frame at spaced points of a common axis, to control movement of the axle longitudinally of the frame, a propeller shaft through which the drive is transmitted from the engine driven shaft to the axle drive shaft, and a universal joint intermediate the ends of the propeller shaft; said universal joint dividing the propeller shaft into two sections and having its center on the aforesaid common axis, that section of the propeller shaft connected to the axle being supported in a bearing mounted on a member connecting the support arms together adjacent to their pivoted ends.

2. In a motor vehicle, in combination, a frame, an engine driven shaft, a propeller shaft to transmit the drive from the engine driven shaft to a driving axle carrying road wheels on opposite sides of the vehicle, and a universal joint intermediate the ends of the propeller shaft; a pair of support arms rigidly connected to the axle at points towards the opposite ends thereof and pivotally connected to the vehicle frame through the medium of rubber bushings at spaced points of the frame; the centers of pivotation of said arms and the center of said universal joint being on a common transverse axis; said support arms controlling movement of the axle longitudinally of the frame and being the sole means of transmitting the driving thrust, the torque reaction, and the braking torque of the road wheels directly to the vehicle frame, and said support arms being provided with seatings for coil springs resiliently resisting upward movement of the axle relatively to the frame.

3. In a motor vehicle, in combination, a frame, an engine driven shaft, a propeller shaft to transmit the drive from the engine shaft to a driving axle carrying road wheels on opposite sides of the vehicle, and a universal joint intermediate the ends of the propeller shaft; a pair of support arms rigidly connected to the axle at points towards the opposite ends thereof and pivotally connected to the vehicle frame through the medium of rubber bushings at spaced points of the frame; said support arms being divergent from their pivot axes on the vehicle frame to their points of connection to the axle, with their pivot axes on the vehicle frame normal to the center lines of the respective support arms, the centers of pivotation of said arms and the center of said universal joint being on a common transverse axis; said support arms being the sole means of taking the driving thrust, the driving torque reaction, and the braking torque of the road wheels, directly to the vehicle frame, and being provided with seatings for coil springs resiliently resisting upward movement of the axle relatively to the frame.

4. The combination according to claim 3, in which a transverse radius rod having one end pivotally connected to the vehicle frame towards one side of the vehicle and its other end pivotally connected to the axle towards the other side of the vehicle, controls movement of the axle transversely of the vehicle frame.

5. In a motor vehicle, in combination, a frame, an engine driven shaft a propeller shaft to transmit the drive from the engine driven shaft to a driving axle carrying road wheels on opposite sides of the vehicle, and a pair of support arms rigidly connected to the axle at points towards the opposite ends thereof, and pivotally connected to the vehicle frame through the medium of rubber bushings at spaced points of the frame; said support arms controlling movement of the axle longitudinally of the frame, and being the sole means of transmitting the driving thrust, the torque reaction, and the braking torque of the road wheels directly to the vehicle frame; said propeller shaft being supported in a bearing mounted on a member connecting the support arms together adjacent their pivoted ends.

6. In a motor vehicle, in combination, a frame, an engine driven shaft, a propeller shaft to transmit the drive from the engine driven shaft to a driving axle carrying road wheels on opposite sides of the vehicle, and a universal joint intermediate the ends of the propeller shaft; a pair of support arms rigidly connected to the axle at points towards the opposite ends thereof, and pivotally connected to the vehicle frame through the medium of rubber bushings at spaced points of the frame, the centers of pivotation of said arms and the center of said universal joint being on a common transverse axis; coil springs between said support arms and the frame resiliently resisting upward movement of the axle relatively to the frame, and a transverse radius rod, having one end pivotally connected to the vehicle frame towards one side of the vehicle and its other end pivotally connected to the axle towards the other side of the vehicle; said support arms controlling movement of the axle longitudinally of the frame, and being the sole means of transmitting the driving thrust, the torque reaction, and the braking torque of the road wheels directly to the vehicle frame, and said transverse radius rod controlling movement of the axle transversely of the vehicle frame.

HAROLD T. YOUNGREN.